(12) United States Patent
Axmann

(10) Patent No.: US 6,273,268 B1
(45) Date of Patent: Aug. 14, 2001

(54) CONVEYOR SYSTEM FOR SORTING PIECE GOODS

(75) Inventor: Norbert Axmann, Sinsheim-Ho (DE)

(73) Assignee: Axmann Fördertechnik GmbH, Sinsheim-Steinsfurt (DE)

( * ) Notice: Subject to any disclaimer, the term of this patent is extended or adjusted under 35 U.S.C. 154(b) by 0 days.

(21) Appl. No.: 09/232,889

(22) Filed: Jan. 15, 1999

(30) Foreign Application Priority Data

Jan. 17, 1998 (DE) .............................................. 198 01 706

(51) Int. Cl.[7] .................................................. B65G 47/34
(52) U.S. Cl. ...................... 209/654; 209/912; 198/370.06
(58) Field of Search .................................. 209/912, 917, 209/651, 654; 198/370.06

(56) References Cited

U.S. PATENT DOCUMENTS

| | | |
|---|---|---|
| 3,231,068 | 1/1966 | Harrison . |
| 3,550,748 * | 12/1970 | Hauer ...................................... 198/38 |
| 3,912,071 | 10/1975 | Nielsen . |
| 4,096,936 * | 6/1978 | Nielsen ................................ 198/356 |
| 4,712,965 * | 12/1987 | Canziani .............................. 414/339 |
| 4,763,771 * | 8/1988 | Geerts ................................. 198/365 |
| 4,781,281 * | 11/1988 | Canziani ............................. 198/365 |
| 4,884,676 * | 12/1989 | Suizu .................................. 198/365 |
| 5,588,520 * | 12/1996 | Affaticati et al. ............... 198/370.06 |
| 5,690,209 * | 11/1997 | Kofoed ............................ 198/370.06 |
| 5,901,830 * | 5/1999 | Kalm et al. ...................... 198/370.06 |
| 5,996,433 * | 12/1999 | Gennari et al. ..................... 74/89.17 |

FOREIGN PATENT DOCUMENTS

| | | |
|---|---|---|
| 42 44 170 C2 | 6/1994 | (DE) . |
| 0 306 144 | 7/1988 | (EP) . |
| 1.313.243 | 6/1962 | (FR) . |
| 1-242316 * | 9/1989 | (JP) ................................. 198/370.06 |
| 1-267212 * | 10/1989 | (JP) ................................. 198/370.06 |
| 08324776a | 12/1996 | (JP) . |

* cited by examiner

Primary Examiner—Christopher P. Ellis
Assistant Examiner—Daniel K Schlak

(57) ABSTRACT

The sorting system comprises a sorting line with ejection stations successively arranged along the line. There is a conveying system guided along the sorting line and having a sorting device successively arranged as well. Each sorting device has a conveyor belt drivable transversely to the sorting line for receiving a parceled article chargeable in a loading station, and for the controlled ejection of the article in an ejection station. The drive of the conveyor belts of the sorting devices takes place purely by mechanical driving means. First driving means are arranged in the region of each ejection station, and are selectively engageable with second driving means of a sorting device. The first driving means cooperates with the second driving means when the respective sorting device passes the first driving means. The first and the second driving means are preferably cooperate by friction grip.

16 Claims, 6 Drawing Sheets

CONVEYOR SYSTEM FOR SORTING PIECE GOODS

BACKGROUND OF THE INVENTION

1. Field of the Invention

The invention relates to a device for sorting piece goods, in which ejection stations are successively arranged along a sorting line. A conveyor system is driven along the sorting line and is equipped with successively arranged sorting devices. Each sorting device has a conveyor belt drivable transverse to the sorting line for receiving a parceled article chargeable in a loading station. The article is then ejected in a controlled manner in an ejection station.

2. The Prior Art

Devices for sorting piece goods with a conveyor system guided along a sorting line with successive sorting devices are generally known.

For example, this type of sorting system is described in a company publication of the US company SANDVIK Sorting Systems, Inc. In this sorting system, ejection stations with lateral ejection slides are arranged successively along a sorting line. A conveying system movable along the sorting line is equipped with sorting devices successively arranged in the conveying direction. Each sorting device has a conveyor belt that is transversely drivable relative to the sorting line for receiving a parceled article, and for the controlled ejection of the article in an ejection station. Each sorting device is equipped with a reversible electric motor for driving the conveyor belt of the respective sorting device. The electric motors of the sorting devices are powered via sliding contacts.

In such a sorting system, the piece goods are loaded in a charging station on the conveyor belts of the sorting devices, one parceled article on each sorting device. The piece goods have a coding, which is detected prior to or in the course of loading the article on the sorting device. The driving motor of the conveyor belt of the sorting device receiving the parceled article rotates right or left depending on the coding, to eject the parceled article in a controlled manner in a defined ejection station.

The known sorting system has been successfully used. However, it is still in need of improvement because each sorting device requires a driving motor that must be supplied with electric energy via sliding contacts, which is very costly.

SUMMARY OF THE INVENTION

It is therefore an object of the present invention to provide a sorting device that is an improvement over the prior art and that comprises a simple and favorably priced structure. It is another object of the invention to provide a sorting device that is not susceptible to failure.

These and other objects of the invention are accomplished by a sorting device comprising a sorting line with ejection stations successively arranged along the line. There is a conveying system guided along the sorting line and having sorting devices successively arranged as well. Each sorting device has a conveyor belt drivable transversely to the sorting line for receiving a parceled article chargeable in a loading station, and for the controlled ejection of the article in an ejection station. The drive of the conveyor belts of the sorting devices takes place purely by mechanical driving means. First driving means are arranged in the region of each ejection station, and are selectively engageable with second driving means of a sorting device. The first driving means cooperates with the second driving means when the respective sorting device passes the first driving means. The first and second driving means preferably cooperate by friction grip.

In the state of the art, the driving motors for the conveyor belts are controlled in the respective ejection stations. In contrast, in the present invention, the selective drive of the conveyor belts of the sorting devices takes place via mechanical driving means which drive the conveyor belt transverse to the sorting line in the ejection station where the parceled article received on the sorting device is ejected, but remain ineffective in all other ejection stations passed by the sorting device.

Even though all kinds of differently designed driving means are conceivable, it has been found that driving means cooperating via friction grip are especially useful.

According to a further development of the invention, the second driving means of the sorting devices each comprise at least one friction wheel joined in a driving connection with the conveyor belt of the associated sorting device. The first driving means associated with the ejection stations are preferably friction strips, which can be selectively engaged with the friction wheels of the sorting devices so as to cooperate with the friction wheels via friction grip. The friction strips extend in the direction of conveyance and contact the friction wheel of the sorting device in the ejection station where a parceled article is to be ejected, thereby rotatably driving the friction wheel as the ejection station is being passed. This has the consequence that the rotary motion of the friction wheel is transmitted to the conveyor belt.

Each of the sorting devices may be equipped with a conically designed friction wheel as the second driving means. The friction strips that engage the friction wheels as an ejection station is being passed are preferably designed in the form of an arc when viewed in the direction of passage of the sorting device. Thus, when a sorting device enters an ejection station, a friction strip engaged with the friction wheel of the respective sorting device first engages a small diameter of the friction wheel and then progressively increasing diameters of the friction wheel.

With this design, the friction wheels are driven when entering an ejection station first with a low rotary speed, and then with an increasing rotary speed as they pass through the ejection station.

Within the framework of the invention, however, each sorting device may be equipped with at least two friction wheels having different diameters and connected to each other with torsional strength. In this case, two friction strip sections serve as first driving means in each ejection station. The friction strip sections are stepped relative to each other so that when a sorting device enters an ejection station, the friction wheel with the smaller diameter engages a friction strip section first. Subsequently, the friction wheel having the larger diameter engages the other friction strip section.

In this embodiment, the conveyor belt of a sorting device is first driven with a lower and then subsequently with a higher speed when the sorting device passes an ejection station whose friction strips have been in their driving positions.

Instead of driving means cooperating via friction grip, it is also possible to have driving means cooperating in a form-locked or positive manner, i.e., for pinions as second driving means of the sorting devices, and for toothed racks as first driving means. The toothed racks are associated with the ejecting stations and engage the pinions of the sorting devices so as to cooperate in a form-locked or positive manner when a sorting device passes through an ejection station. The use of driving means cooperating in a form-locked manner was found to be particularly useful in connection with sorting devices operating at low speeds, but is intended for sorting heavy pieced goods.

According to another further development of the invention, the second driving means of the sorting devices each comprise a miter gear, which is arranged below the conveyor belt and has a driving shaft projecting toward the side pointing away from the conveyor belt. The friction wheel or pinion is selectively engageable by friction grip or form-locked contact with one of the friction strips or toothed racks in the ejection stations and is received on the driving shaft with torsional strength.

The friction strips or toothed racks are preferably actuated transverse to the longitudinal expanse of the sorting line, between a driving position in which the friction strips or toothed rack cooperate with the friction wheel by friction grip when passing a sorting device, and an off-side disengaged position.

In this embodiment, the friction wheels or pinions are associated with the sorting devices in a fixed manner. The friction strips and toothed racks, when the parceled article is ejected in the respective ejection station, are driven into the path of the friction wheel or pinion of the sorting device so that the friction wheel or pinion is driven over the length of the friction strip or toothed rack as the sorting device is passing through the respective ejection station.

According to another development of the invention, the friction strips and toothed racks are arranged on guide or steering rods pivoting about pivot points disposed on the device, and are actuated by the guide rods between their driving and disengaged positions.

The guide rods on which the friction strips or toothed racks are arranged are preferably double guide rods each having a lever arm projecting from the pivot point toward the side facing away from the friction strip or toothed rack. In this case, the projecting lever arms are engaged by means for actuating the friction strips or toothed racks between their driving positions and disengaged positions. These means are disposed offset from the track of the friction wheels or pinions of the sorting devices.

According to another embodiment of the invention, there are two friction strips or toothed racks spaced apart from each other transverse to the conveying direction, and which are associated in pairs with each ejection station. The friction strips or toothed racks selectively engage a friction wheel or pinion of a sorting device passing through the ejection station on the right or left side for cooperating with the friction wheel or, respectively, pinion of the sorting device.

Because the friction strips and toothed racks selectively engage a friction wheel and, respectively, a pinion in an ejection station on the right or left side, the conveyor belts can be selectively driven in either running direction. Thus, the parceled article on the belt of a sorting device is selectively ejected in the respective ejection station on the right or left side.

The friction strips and the toothed racks are driven from their disengaged positions into their driving positions electromagnetically or pneumatically, preferably against the resetting spring forces driving the friction strips or toothed racks into their respective disengaged positions. However, double-action operating cylinders may be used as actuating means as well.

According to another development of the invention, the miter-type gears of the sorting devices are equipped with a driven shaft that receives with torsional strength at least one friction roller engaging the lower strand of the conveyor belt of the respective sorting device.

Therefore, the driving motion derived from the friction strips or toothed racks by the miter gear is reversed at a right angle and then transmitted to the lower strand of the conveyor belt via at least one additional friction roller. The lower strand is usefully supported by a counter-pressure roller within the region of the additional friction roller.

In another embodiment of the invention, the conveying system, to which the sorting devices are successively coupled in the direction of conveyance, comprises a loop drive. The loop drive is guided via reversing rollers rotating in vertical planes. The loop drive of the conveying system may be a V-belt.

The device has at least one feeding device for loading the sorting devices with piece goods at the head of the sorting line at a charging station. The feeding device usefully feeds into the sorting line at an acute angle versus the conveying system.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
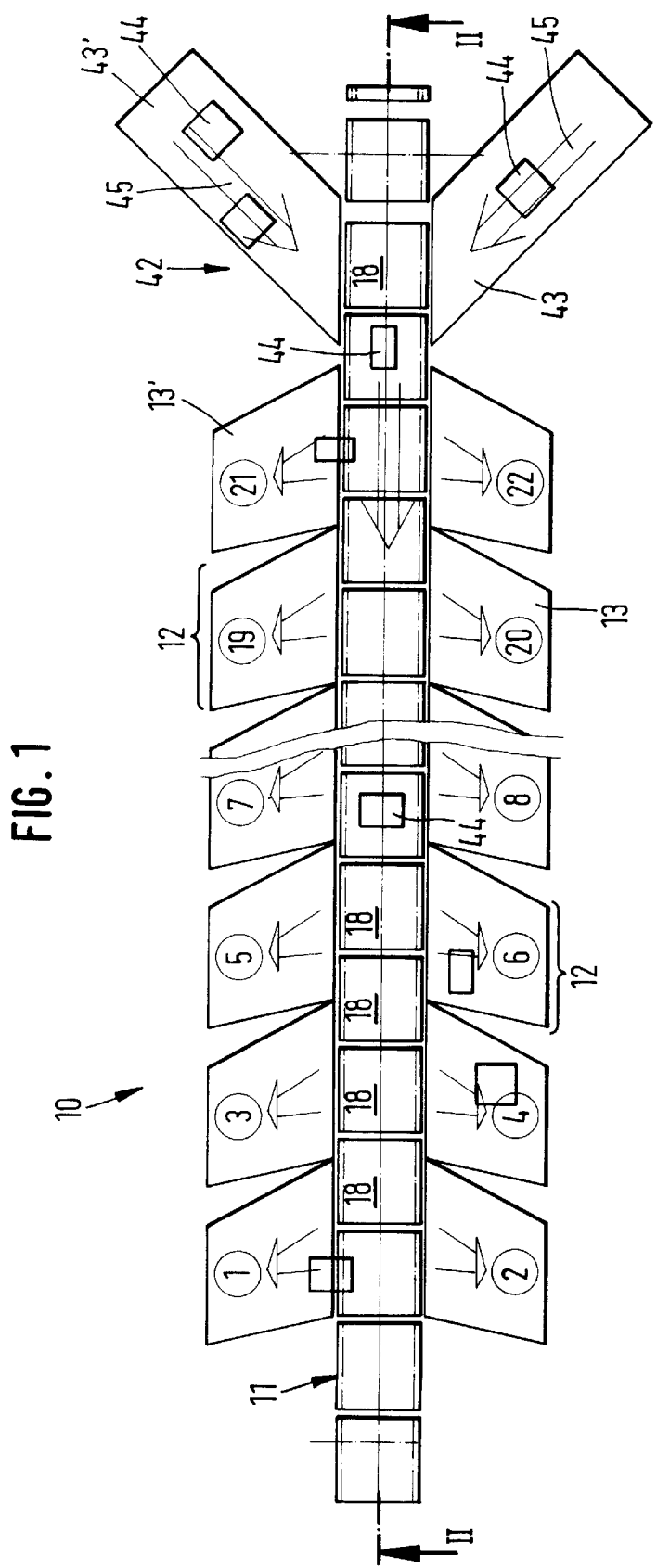
FIG. 1 is a top view of a device for sorting piece goods, in which ejection stations with ejection slides on both sides are successively arranged along a sorting line.
Figure 2:
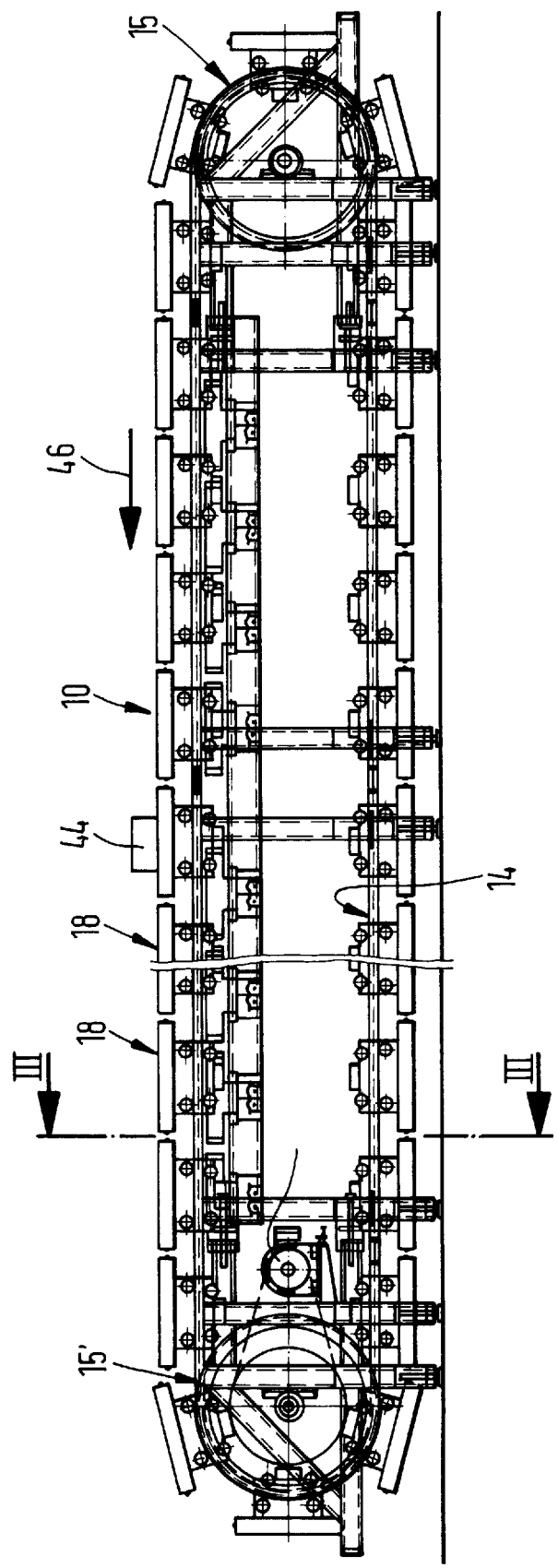
FIG. 2 is a longitudinal section along line II—II in FIG. 1.
Figure 3:
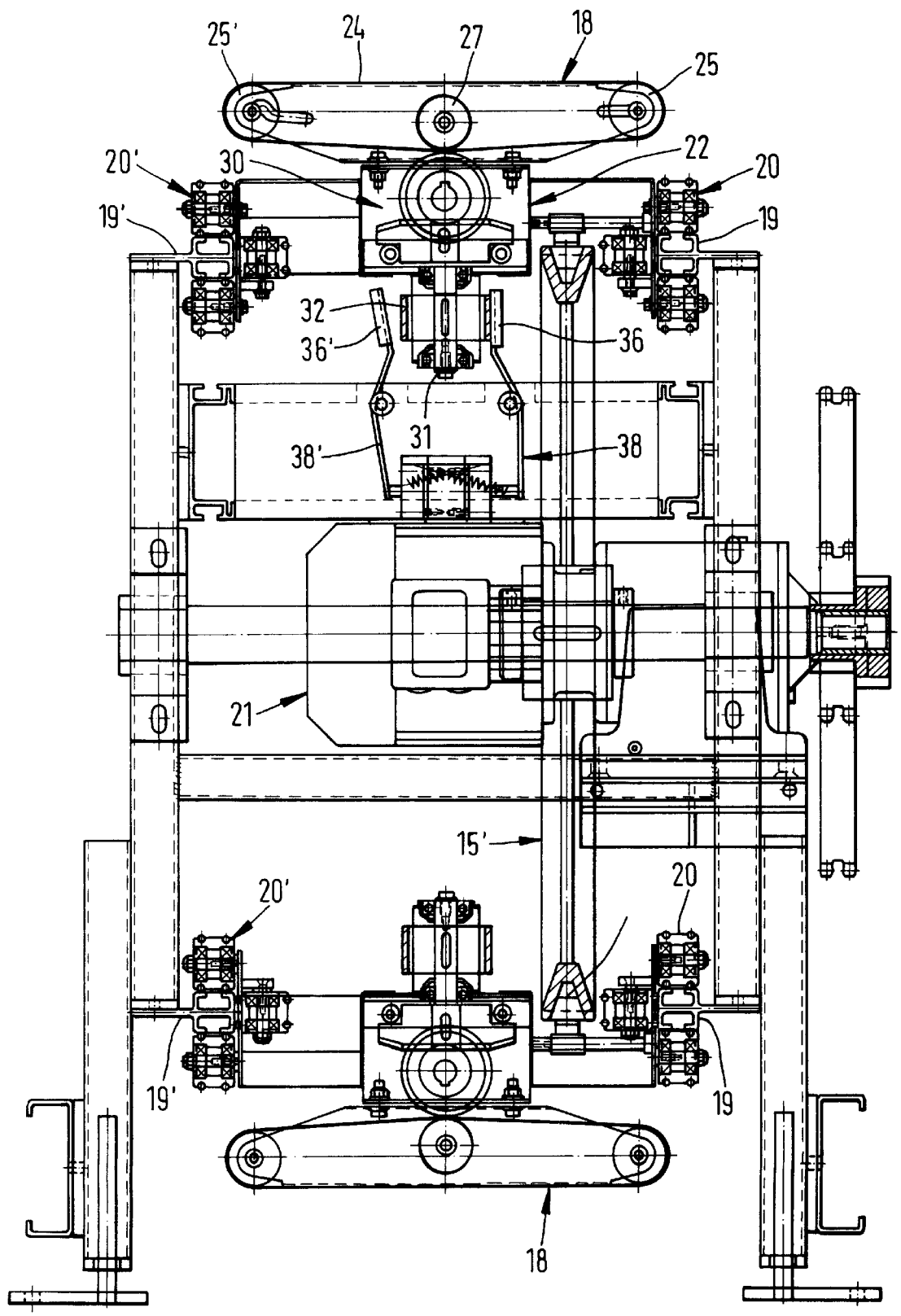
FIG. 3 is a cross section through line III—III in FIG. 2.

Referring now in detail to the drawings, FIG. 1 shows the device 10 for sorting piece goods having a long-stretching sorting line 11. There are ejection stations 12 with lateral ejection slides 13, 13' successively arranged along line 11. As shown in FIGS. 2 and 3, device 10 further comprises a conveying system 14 with a V-belt 16 as an endless conveying means guided via reversing rollers 15, 15' mounted fixed on the device. Sorting devices 18 are successively coupled to V-belt 16.

Sorting devices 18 are guided via guide rollers arranged on both sides of the sorting devices and cooperate with guide rails 19, 19' extending spaced from each other and mounted fixed on the device. Sorting devices 18 are equipped on both sides with two sets of three guide roller pairs 20, 20' in each set, which are arranged spaced from each other in the conveying direction. Two pairs of guide rollers each receive a guide rail 19, 19' between each other, and the third pair of guide rollers of a set of guide rollers engages the guide rails 19, 19' on the inside. Rails 19, 19' are mounted fixed on the device. This assures precise longitudinal guidance of the sorting devices 18.

The reversing rollers 15, 15' guide V-belt 16 as the endless conveying means rotate in a vertical plane, so that sorting devices 18 coupled to V-belt 16 are returned below the sorting line. Corresponding with the guidance of V-belt 16, device 10 is equipped with upper and lower guide rails 19, 19' for guiding sorting devices 18. Within the region of the reversing rollers 15, 15', guide rails 19, 19' extending on both sides of the sorting line are connected with each other via arched girders. V-belt 16 of conveying system 14 is driven by an electric motor 21, which is connected with one of the reversing rollers via a further belt drive. This is indicated in FIG. 2.

Figure 4:
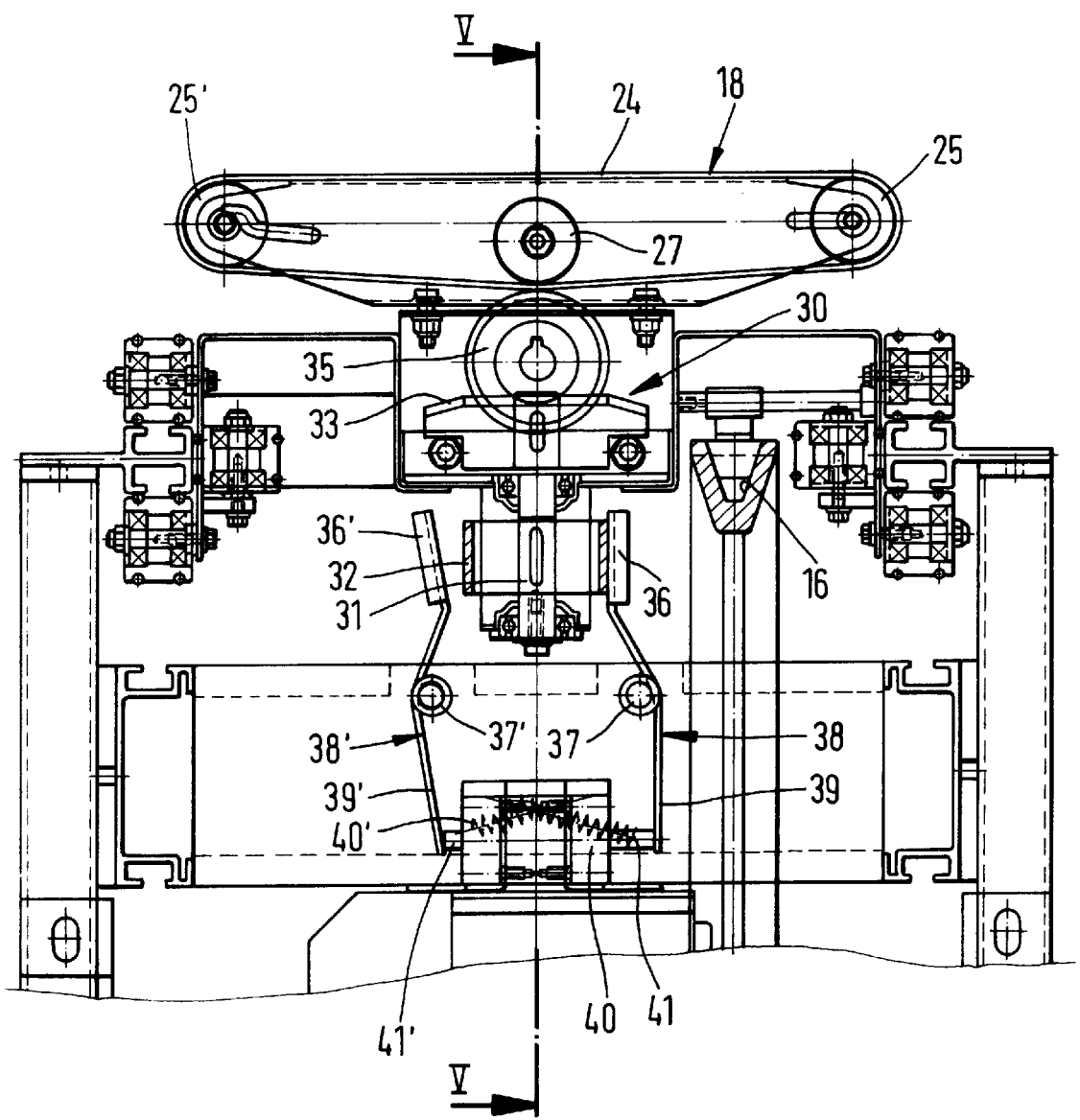
FIG. 4 is an enlarged cutout from FIG. 3 showing a sorting device guided along the sorting line, with a conveyor belt drivable transversely to the longitudinal expanse of the sorting line, and with the means for selectively driving the conveyor belt.
Figure 5:
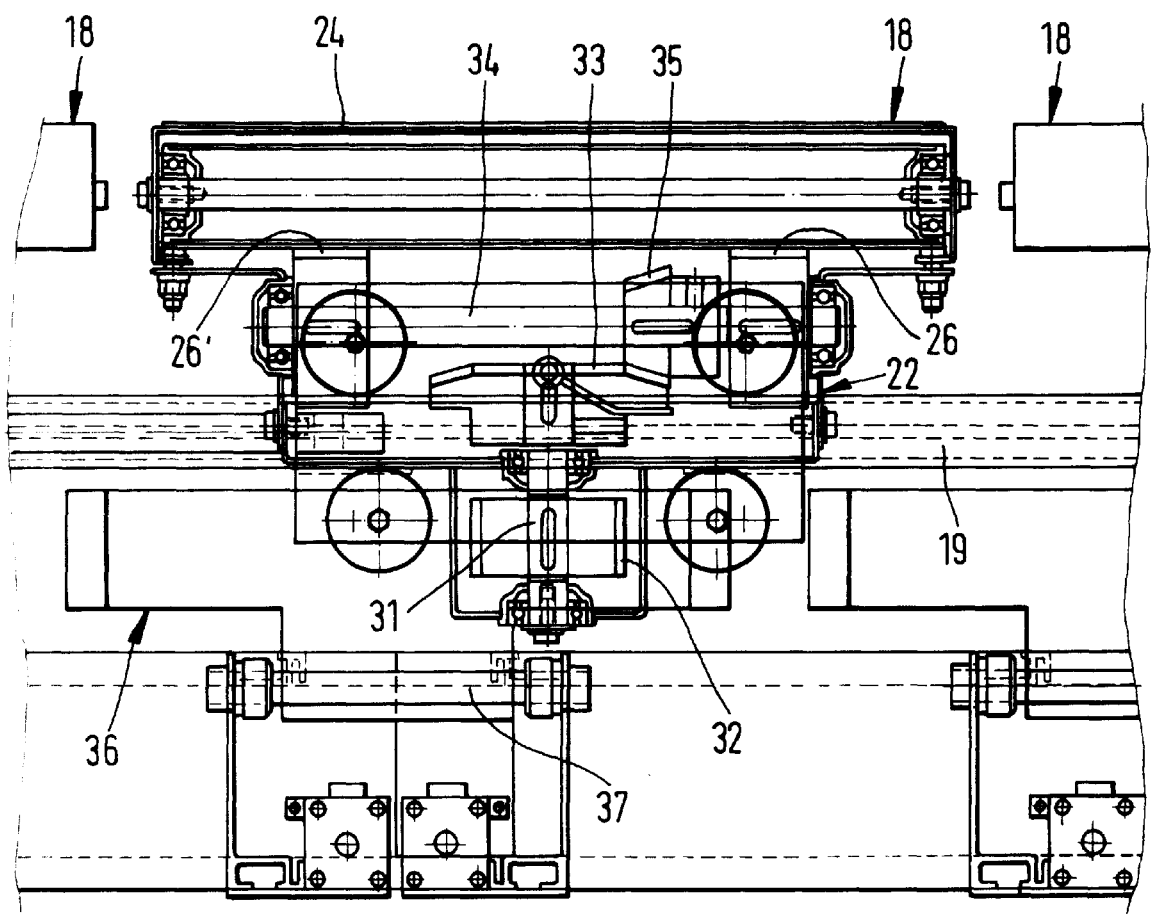
FIG. 5 is a longitudinal section along line V—V of FIG. 4.

The lateral guide roller sets 20, 20' of each sorting device 18 are supported on both sides by a driving carriage 22. As shown in FIG. 4, conveyor belt 24 is received on carriage 22 and is drivable transversely to the longitudinal direction of sorting line 11. Conveyor belts 24 of sorting devices 18 are guided via reversing rollers 25, 25' with rotary axles extending in the running direction of V-belt 16. Conveyor belts 24 are driven via two friction rollers 26, 26' spaced from each other in the conveying direction of sorting devices 18 and rotating on rotary axles extending in the direction of conveyance, as shown in FIG. 5. Friction rollers 26, 26' engage the lower strand of conveyor belt 24 within the region of a counter-pressure roller 27 supporting the inner side of the belt.

Friction rollers 26, 26' are each driven by a bevel gearing 30 (shown in FIG. 4) having a driving shaft 31, which projects from the side pointing away from the conveyor belt 24 of the respective sorting device 18. A further friction wheel 32 is received on driving shaft 31 with torsional strength. Bevel gearing 30 is received in driving carriage 22 of sorting device 18 and comprises a bevel gear 33 mounted on driving shaft 31. As shown in FIG. 5, bevel gear 33 cooperates with a bevel pinion 35, which is arranged with torsional strength on shaft 34. Shaft 34 receives the two friction rollers 26, 26' engaging the lower strand of conveyor belt 24.

Two friction strips 36, 36', which are selectively engageable with friction wheel 32, are associated with each ejection station 12 of sorting line 11. Friction strips 36, 36' extend in the longitudinal direction of sorting line 11. Friction strips 36, 36' are each arranged on double guide rods 38, 38' and pivot about pivot axles 37, 37' mounted fixed on the device. This way, one friction strip 36 can be selectively caused to abut friction wheel 32 on one side, and the other friction strip 36' can be selectively caused to abut friction wheel 32 on the other side. The double guide rods 38, 38' supporting the friction strips 36, 36' have lever arms 39, 39' projecting from pivot axles 37, 37' toward the side facing away from the respective friction strip. Lever arms 39, 39' are engaged on one side by spring means 40, 40' which act on friction strips 36, 36' to drive them into the off-side disengaged positions, and on the other side by actuating means 41, 41' acting pneumatically or electro-magnetically to swing friction strips 36, 36' into their driving positions.

In the operating position shown in FIGS. 3 and 4, friction strip 36 abuts friction wheel 32 on the driving shaft 31 of bevel gearing 30. Friction strip 36 is thus in its driving position. When a sorting device 18 is driven via V-belt 16 along the sorting line near ejection station 12, friction wheel 32 and friction strip 36 cooperate via friction grip, and the rotational motion of driving shaft 31 of bevel gearing 30 is transmitted to conveyor belt 24 via bevel gearing 30 and via friction rollers 26, 26' engaging the lower strand of conveyor belt 24. The result is that conveyor belt 24 revolves in the corresponding direction. The conveyor belt is driven in the opposite sense when friction strip 36 abutting friction wheel 32 is driven into its disengaged position and friction strip 36' cooperates with friction wheel 32.

When device 10 is employed as intended, parceled articles 44 are fed as shown by arrows 45 (FIG. 1) into a charging station 42 by feeding devices 43, 43' which feed slanted into the head of sorting line 11. One parceled article 44 is loaded in each of sorting devices 18 moving along sorting line 14 in the direction of arrow 46 (in FIG. 2) by conveying system 14. The articles 44 have a coding, which is detected as a parceled article 44 is being loaded in a defined sorting device 18. Depending on the coding, friction strip 36, 36' of the ejection station 12 where the respective parceled article is to be ejected is driven into its driving position by a controlling means which is of no interest here in detail. Because friction strips 36, 36' are arranged in each ejection station 12 in pairs, and one or the other friction strip can be selectively actuated and driven into its driving position, the articles can be selectively ejected on the right or left side into one of the ejection slides 13, 13' arranged on both sides of the sorting line.

Figure 6:
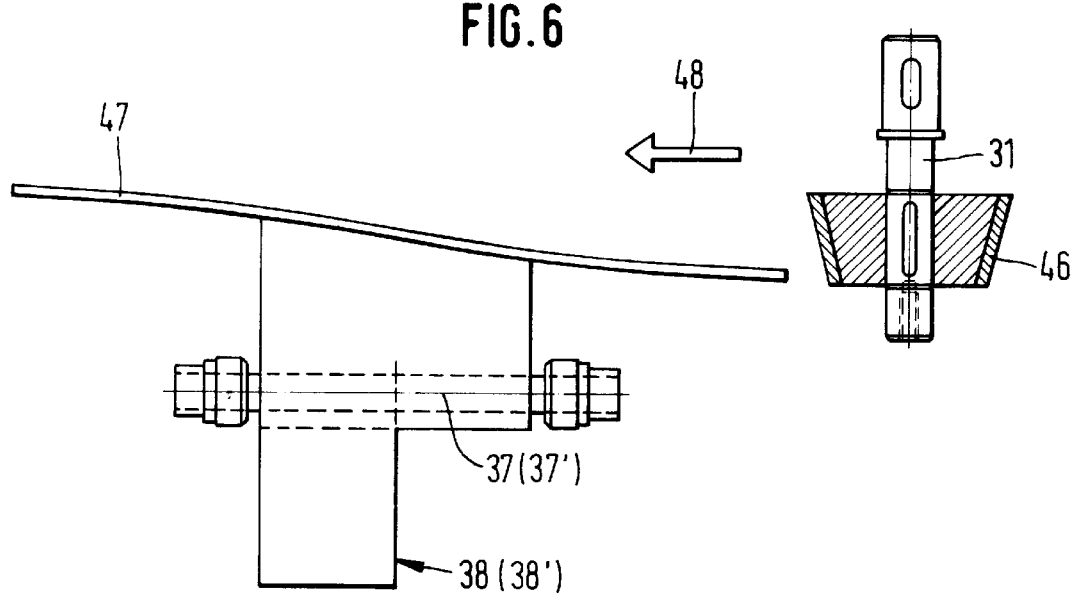
FIG. 6 shows a sectional view of a driving shaft of a miter gear of a sorting device, with a conical friction wheel and a curved friction strip, as in FIG. 5.

The means for selectively driving the conveyor belts 24 of sorting devices 18 may also comprise a conically shaped friction wheel 46 and friction strips 47 extending in a curved form according to FIG. 6. Friction wheel 46 is received with torsional strength on driving shaft 31 projecting from miter gearing 30 of a sorting device 18. Friction strips 47 are arranged in the same way as friction strips 36, 36' on double guide bars 38, 38' pivoting about pivot axles 37, 37'.

When a sorting device 18 equipped with a conical friction wheel 46 passes through an ejection station fitted with curved friction strips 47 in the direction of arrow 48, and one of friction strips 47 is pivoted into its driving position, friction strip 47 first engages a small diameter of friction wheel 46, and then larger friction wheel diameters as the sorting device continues to move through the station. Accordingly, conveyor belt 24 of the respective sorting station 18 is driven at an accelerating speed as the sorting device continues to pass through the ejection station.

Figure 7:
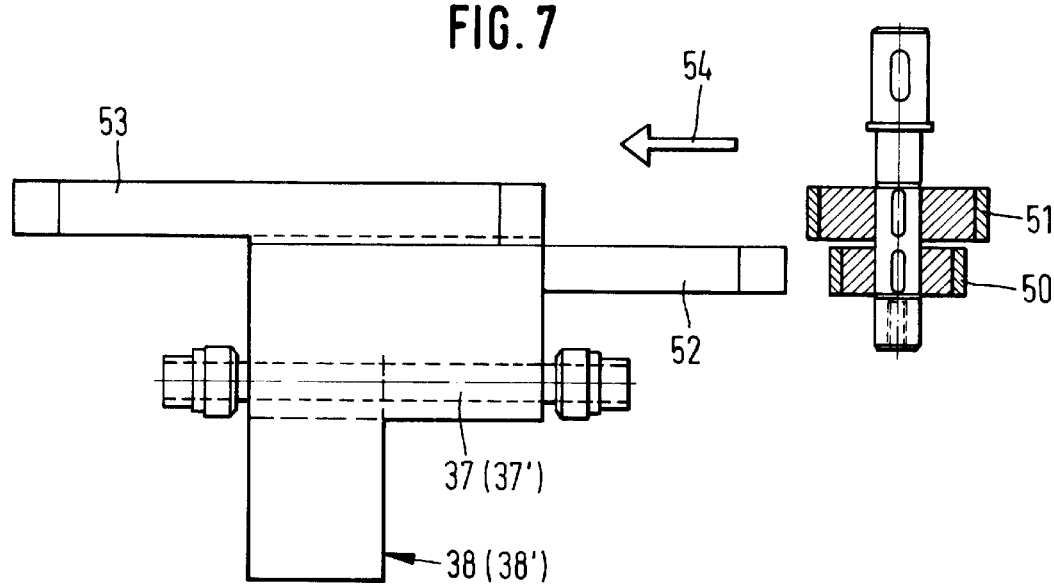
FIG. 7 shows a sectional view as in FIG. 6 of a driving shaft of a miter gear of a sorting device with two friction wheels having different diameters, and with a friction strip which has two sections that are displaced against each other.

Instead of being fitted with a conical friction wheel 46, the miter gear of the sorting devices 18 may be equipped with two friction wheels 50, 51, shown in FIG. 7, which are spaced apart axially and arranged with torsional strength on the downwardly projecting driving shaft 31 of the miter gear of sorting devices 18. The friction strips that engage friction wheels 50, 51 each comprise a first friction strip section 52 and a second friction strip section 53. The friction strip sections 52 and 53 are in turn arranged on the double guide rods 38, 38' pivoting about the pivot axles 37, 37'. In the present arrangement, friction strip section 52 projects from double guide bars 38, 38' against the direction of passage of sorting device 18 marked by arrow 54. Friction strip section 53 is arranged displaced in the direction of passage and projects from double guide bars 38, 38' in the direction of passage.

When a sorting device equipped with friction wheels of different diameters pulls into an ejection station having its friction strip sections 52, 53 pivoted into their driving positions, friction wheel 50 starts to cooperate with friction strip section 51 first. Subsequently friction wheel 51 cooperates with friction strip section 53. Accordingly, conveyor belt 24 of the respective sorting device 14 is driven first via friction wheel 50 having the smaller diameter, and subsequently via fiction wheel 51 once it is frictionally engaged by friction strip section 53 and the cooperation of friction wheel 50 with friction strip section 52 is ended. Therefore, conveyor belt 24 is driven at two different speeds as the sorting device is passing through ejection station, first at a low and subsequently at an increased speed.

Figure 8:
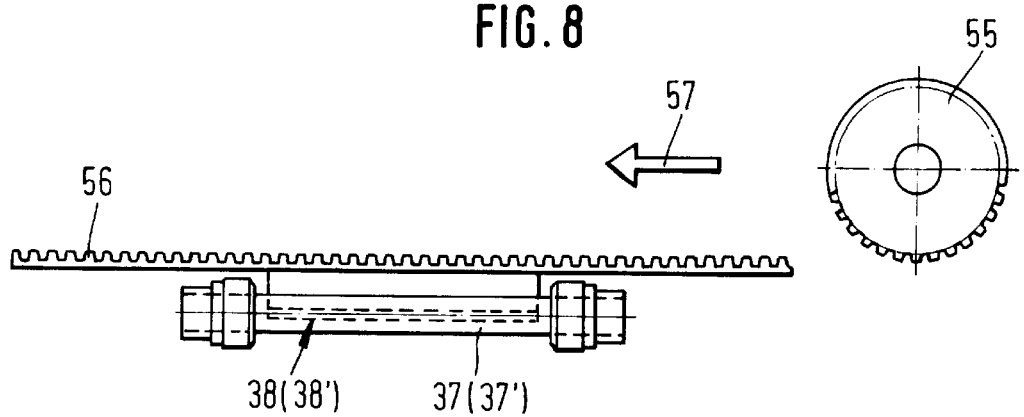
FIG. 8 is a top view of an alternative design with a pinion instead of a friction wheel and a toothed rack instead of a friction strip.

Instead of being driven by friction grip, it is also possible to drive the conveyor belts 24 of the sorting devices via positively engageable driving means as the sorting devices pass through the ejection stations. FIG. 8 shows a top view of a pinion 55, which is received with torsional strength on a driving shaft 31 of a miter gear of sorting devices 18. Pinion 55 is selectively engageable with toothed racks 56 as it is passing through the ejection stations. These toothed racks are arranged on double guide rods 38, 38' like the friction strips in the embodiments described above, and are pivotable into their driving positions about the pivot axles 37, 37'.

Once a toothed rack 56 has been pivoted in an ejection station into its driving position and a sorting device 18 equipped with a pinion 55 passes through the ejection station in the direction of arrow 57, the teeth of pinion 55 engage the teeth of toothed rack 56 and drive the conveyor belt 24 of sorting device 18. Positively engageable means for driving the conveyor belts have been successfully employed, particularly with devices for sorting heavy piece goods and with conveying belts operating at moderate speeds.

Accordingly, while only a few embodiments of the present invention have been shown and described, it is obvious that many changes and modifications may be made thereunto without departing from the spirit and scope of the invention.

What is claimed is:

1. A device for sorting piece goods along a sorting line, comprising:
    a plurality of ejection stations successively arranged along the sorting line for ejecting parceled articles from the sorting line;
    a motor driven conveying system on the sorting line, said conveying system having a conveying direction and being guided and driven and equipped with successively arranged sorting devices;
    a conveyor belt on each sorting device, said conveyor belt being drivable transversely to the sorting line for receiving a parceled article from a loading station and ejecting the article in one of the ejection stations;
    first driving means arranged near each ejection station and comprising friction strips extending in the conveying direction; and
    second driving means connected to each sorting device and comprising at least one friction wheel in a driving connection with the conveyor belt of the respective sorting device, and a miter gear arranged below the conveyor belt and having a driving shaft projecting from a side facing away from the conveyor belt, said driving shaft receiving the friction wheel with torsional strength and wherein the miter gear further comprises a friction roller received on a driven shaft and engaging a lower strand of the conveyor belt in a region where a counterpressure roller that supports an inner side of the conveyor belt engages the conveyor belt, wherein the counterpressure roller and friction roller are arranged without spacing therebetween except for passage of the belt;
    and wherein said first driving means is selectively engageable via friction grip with said second driving means when passing through the ejection stations, to transmit a rotational motion to the conveyor belt of said sorting device and mechanically driving the conveyor belt in an ejection station.

2. The device according to claim 1, wherein the second driving means are conical friction wheels and wherein the friction strips engaging said friction wheels are curved when viewed in the direction of passage of the sorting devices, such that when a sorting device enters an ejection station, a friction strip cooperating with the friction wheel first engages near a small diameter of the friction wheel, and subsequently progressively on increasing diameters of the friction wheel.

3. The device according to claim 1, wherein each sorting device is equipped with at least two friction wheels having different diameters and wherein the first driving means comprises two friction strip sections associated with each ejection station, said friction strip sections being stepped relative to each other so that when a sorting device enters an ejection station, the friction wheel with a smaller diameter cooperates first with one friction strip section, and subsequently the friction wheel with a larger diameter cooperates with the other friction strip section.

4. The device according to claim 1, wherein the friction strips are driven transverse to the longitudinal direction of the sorting line, between a driving position cooperating with the friction wheel as the sorting device is passing through, and an off-side disengaged position.

5. The device according to claim 4, wherein the friction strips are arranged on guide rods pivoting about pivot axles mounted on the device, said friction strips being actuated by said guide rods between the driving and disengaged positions.

6. The device according to claim 5, wherein the guide rods are double guide rods, each having a lever arm projecting from the pivot axle toward a side facing away from the friction strip; and wherein the lever arms are engaged by means for actuating the friction strips between their driving and their disengaged positions.

7. The device according to claim 1, wherein the friction strips are associated by pairs with each ejection station, said friction strips engaging a friction wheel during the course of passage of a sorting device for selectively cooperating with one of the left or right sides of the friction wheel.

8. The device according to claim 1, wherein the friction strips are electromagnetically or pneumatically drivable from their respective disengaged positions into their driving positions.

9. The device according to claim 8, wherein the friction strips are driven into their respective driving positions against the action of resetting spring forces.

10. The device according to claim 1, wherein the friction strips are driven from their disengaged positions into their driving positions by double-acting operating cylinders.

11. The device according to claim 1, wherein the conveying system comprises a endless conveying means guided via reversing rollers, and wherein said sorting devices are successively coupled to said endless conveying means in the conveying direction.

12. The device according to claim 11, wherein the loop endless conveying means is guided via reversing rollers rotating in vertical planes.

13. The device according to claim 11, wherein the endless conveying means of the conveying system is a V-belt.

14. The device according to claim 13, further comprising at least one feeding device for loading the sorting devices with piece goods arranged at a head of the sorting line, said feeding device forming a charging station.

15. The device according to claim 14, wherein the feeding device feeds into the sorting line at an acute angle versus the conveying direction.

16. A device for sorting piece goods along a sorting line, comprising:

a plurality of ejection stations successively arranged along the sorting line for ejecting parceled articles from the sorting line;

a conveying system on the sorting line, said conveying system having a conveying direction and being guided and driven and equipped with successively arranged sorting devices;

a conveyor belt on each sorting device, said conveyor belt being drivable transversely to the sorting line for receiving a parceled article from a loading station;

first driving means comprising toothed racks arranged near each ejection station; and second driving means comprising pinions connected to each sorting device, said racks engaging the pinions of the sorting devices for cooperating with said pinions as a sorting device is passing through an ejection station, and wherein the second driving means further comprises a miter gear arranged below each conveyor belt and having a driving shaft projecting from a side facing away from the conveyor belt of the respective sorting device, said driving shaft receiving a friction wheel with torsional strength, said pinion selectively engaging one of the toothed racks arranged in the ejection stations in a form-locked manner, and further comprising a friction roller received on a driven shaft, said friction roller engaging a lower strand of the belt conveyor in a region where a counter pressure roller supporting the belt engages the belt, wherein the counterpressure roller and friction roller are arranged without spacing therebetween except for passage of the belt;

to transmit a rotational motion to the conveyor belt of said sorting device and mechanically driving the conveyor belt in an ejection station.

* * * * *